(12) United States Patent
Sugawara

(10) Patent No.: US 10,670,089 B2
(45) Date of Patent: Jun. 2, 2020

(54) EXTERNAL CONTROL TYPE FAN CLUTCH DEVICE

(71) Applicant: USUI CO., LTD., Shimizu-cho, Sunto-gun, Shizuoka (JP)

(72) Inventor: Hiroki Sugawara, Shimizu-cho (JP)

(73) Assignee: USUI CO., LTD. (JP)

( * ) Notice: Subject to any disclaimer, the term of this patent is extended or adjusted under 35 U.S.C. 154(b) by 207 days.

(21) Appl. No.: 15/747,177

(22) PCT Filed: Jul. 22, 2016

(86) PCT No.: PCT/JP2016/071578
§ 371 (c)(1),
(2) Date: Jan. 24, 2018

(87) PCT Pub. No.: WO2017/018348
PCT Pub. Date: Feb. 2, 2017

(65) Prior Publication Data
US 2018/0216675 A1    Aug. 2, 2018

(30) Foreign Application Priority Data

Jul. 27, 2015 (JP) ................................ 2015-148109

(51) Int. Cl.
| | |
|---|---|
| *F16D 35/02* | (2006.01) |
| *F01P 7/04* | (2006.01) |
| *F01P 5/04* | (2006.01) |
| *F01P 7/08* | (2006.01) |

(52) U.S. Cl.
CPC ............. *F16D 35/024* (2013.01); *F01P 5/04* (2013.01); *F01P 7/042* (2013.01); *F01P 7/081* (2013.01)

(58) Field of Classification Search
CPC . F16D 35/024; F16D 35/02; F01P 5/04; F01P 7/042; F01P 7/081; F01P 7/08
See application file for complete search history.

(56) References Cited

U.S. PATENT DOCUMENTS

| | | | | |
|---|---|---|---|---|
| 9,328,781 B2* | 5/2016 | Kubota | ................... | F01P 7/042 |
| 2006/0272918 A1* | 12/2006 | Shiozaki | ................ | F01P 7/042 |
| | | | | 192/58.61 |
| 2014/0360834 A1 | 12/2014 | Kubota et al. | | |

FOREIGN PATENT DOCUMENTS

| | | |
|---|---|---|
| EP | 2 811 133 | 12/2014 |
| JP | 51-22744 | 2/1976 |
| JP | 2014-238111 | 12/2014 |

* cited by examiner

*Primary Examiner* — Jacob S. Scott
*Assistant Examiner* — Lillian T Nguyen
(74) *Attorney, Agent, or Firm* — Gerald E. Hespos; Michael J. Porco; Matthew T. Hespos

(57) ABSTRACT

An external control type fan clutch device has an electromagnet fixed to a rotating shaft. The electromagnet is energized to activate a valve member formed of a plate spring and an armature and provided to a drive disk or a sealed housing to externally control opening and closing an oil circulating flow passage (oil supply port). The valve member is structured so that the armature attached to the plate spring of the valve member is divided into a plurality of pieces in the direction from the base end side to the oscillating end side of the plate spring to provide a plurality of bend points of the plate spring.

1 Claim, 3 Drawing Sheets

EXTERNAL CONTROL TYPE FAN CLUTCH DEVICE

BACKGROUND

Field of the Invention

The present invention generally relates to external control type fan clutch devices of a type in which fan rotation for engine cooling in an automobile or the like is controlled by following a change in external ambient temperature or a change in rotation.

Description of the Related Art

Conventionally, as an external control type fan clutch device of this type, one type has been known in which a torque transmission chamber having a drive disk built therein is provided inside a sealed housing formed of a non-magnetic case and a cover attached to the case and supported via a bearing on a rotating shaft having a drive disk fixed thereto, at least one oil circulating flow passage (oil supply port) communicating with a torque transmission gap is provided on a side wall of an oil reservoir chamber formed by a hollow in the drive disk, a magnetic valve member which opens and closes the oil circulating flow passage is provided, and the valve member is activated by an electromagnet to increase and decrease an effective contact area of oil (a viscous fluid) in the torque transmission gap formed between the drive side and the driven side to control rotation torque transmission from the drive side to the driven side.

An external control type fan clutch device of this type, for example, includes one in which an electromagnet fixed to a rotating shaft side is energized to activate a valve member provided to a drive disk or sealed housing via an armature to control opening and closing of an oil circulating flow passage (oil supply port) from outside. The structure of the device is such that a magnetic flux by excitation of a coil of the electromagnet is transmitted through a magnetic path of the rotating shaft formed of a magnetic material with high magnetic permeability to the armature of the valve member formed of a plate spring to form a magnetic circuit (magnetic loop) for return to the electromagnet again, and the valve member inside the clutch device is activated by the electromagnet to control a flow rate of torque transmission oil (see Japanese Patent Application Laid-Open No. 2014-238111).

However, when the above-described conventional external control type fan clutch device is employed, there are disadvantages described below.

That is, in the conventional external control type fan clutch device, while the amount of oil supply to the torque transmission chamber is controlled by the valve member, it is required to increase a stroke (open/close operation amount or movement amount) of the valve member in order to increase the amount of oil supply. However, the valve member for oil supply to open and close the oil circulating flow passage (oil supply port) provided to the drive disk or the sealed housing is structured with an armature of a single piece type (one sheet) laminated on a back surface of the plate spring, and a base end of the plate spring is attached to the drive disk or the sealed housing so that the armature of the valve member is positioned near the rotating shaft. Thus, if the stroke of the valve member is increased to increase an opening amount in order to increase the amount of oil supply, the plate spring of the valve member is separated greatly away from the oil circulating flow passage, thereby causing inconveniences such as a shortage of the attracting force of the armature by the electromagnet and an increase of the stress of the plate spring to make valve open/close operation unstable. Moreover, if an electromagnet with a large magnetic force is used to enhance the attracting force of the plate spring by the electromagnet and the armature, the dimensions and weight of the electromagnet are increased, thereby making it difficult to achieve a small-sized, light-weight fan clutch device and also requiring more power consumption.

The present invention was made to solve the problems of the above-described conventional external control type fan clutch device, and is to provide an external control type fan clutch device with operation characteristics of a valve member improved by changing an armature of the valve member from the conventional single-piece type to a divided type into a plurality of pieces.

SUMMARY

The external control type fan clutch device according to the present invention is such that, to improve characteristics in an electromagnet valve, the armature of the valve member is made of a plural divisional type to increase the number of bend points of the plate spring, thereby not only allowing the stroke of the valve member to be easily ensured but also allowing the stress of the plate spring to be dispersed. The gist thereof is to provide the device includes: a sealed housing formed of a non-magnetic case and a cover attached to the case and supported via a bearing on a rotating shaft having a drive disk fixed thereto; a torque transmission chamber having the drive disk built therein and an oil reservoir chamber provided inside the sealed housing; at least one oil circulating flow passage communicating with a torque transmission gap and provided on a side wall surface of the oil reservoir chamber; a magnetic valve member which opens and closes the oil circulating flow passage, the valve member configured to have an armature attached to a plate spring whose one end is attached to the sealed housing; an electromagnet supporting the rotating shaft via a bearing; and a ring-shaped magnetic member provided on an outer periphery of the rotating shaft, wherein the valve member is activated by the electromagnet to control opening and closing of the oil circulating flow passage, and an effective contact area of oil in the torque transmission gap formed between a drive side and a driven side is increased and decreased to control rotation torque transmission from the drive side to the driven side, wherein the valve member has the structure in which the armature attached to the plate spring of the valve member is divided into a plurality of pieces in a direction from a base end side toward an oscillating end side of the plate spring to provide a plurality of bend points of the plate spring.

In the external control type fan clutch device according to the present invention, the armature of the valve member is made to be divided into a plurality of pieces to provide a plurality of bend points to the plate spring. This allows the stress of the plate spring to be dispersed and allows the valve member to be activated without increasing an attracting force of the armature by the electromagnet even if the stroke of the valve member is set large to increase the amount of oil supply. Therefore, according to the present invention, even if the plate spring of the valve member is separated greatly away from the oil circulating flow passage, the stress of the plate spring is not increased, and the attracting force of the armature by the electromagnet does not run short. Thus, stable valve open/close operation can be achieved with a normal electromagnet, and no electromagnet with a large magnetic force is required to enhance the attracting force of the plate spring, thereby allowing a small-sized, light-weight fan clutch device to be achieved.

DETAILED DESCRIPTION

Figure 1:
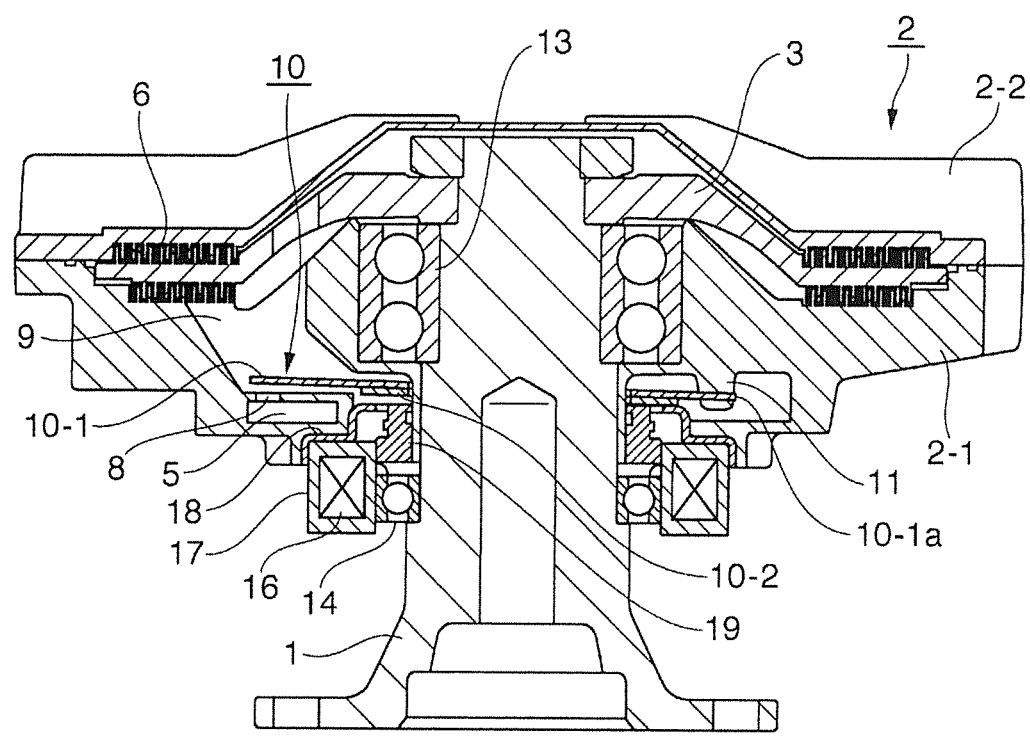
FIG. 1 is a schematic longitudinal sectional view depicting an embodiment (a valve open state) of an external control type fan clutch device according to the present invention.

In the external control type fan clutch device depicted in FIG. 1, a sealed housing 2 formed of a case 2-1 and a cover 2-2 is supported via a bearing 13 on a rotating shaft (drive shaft) 1 which rotates by driving of a driving unit (engine). Inside a torque transmission chamber 6 provided in the sealed housing 2, a drive disk 3 fixed to the rotating shaft 1 is built. The case 2-1 includes an oil flow passage 9 leading to the torque transmission chamber 6 and an oil reservoir chamber 5 provided to have a hollow therein. Above the oil reservoir chamber (oil storage chamber) 5, an oil circulating flow passage (oil supply port) 8 communicating with the oil flow passage 9 is provided. The device has a structure in which oil inside the oil reservoir chamber 5 is supplied via the oil circulating flow passage (oil supply port) 8 and an oil flow space 9 to the torque transmission chamber 6. An oil supply valve member 10 which opens and closes the oil circulating flow passage 8 is formed of a plate spring 10-1 and an armature 10-2. The armature 10-2 of the valve member is externally inserted in the rotating shaft 1 so as to be positioned near the rotating shaft 1, and a base end of the plate spring 10-1 is fixed by a screw or the like to a fastened portion 11 provided on a back surface side of the case inside the oil flow passage 9. On the other hand, on a driving unit side of the sealed housing 2, a ring-shaped electromagnet 16 is supported on a ring-shaped electromagnet support 17 supported via a bearing 14 on the rotating shaft 1. On the outer periphery of a base of the case 2-1 externally inserted in the outer periphery of the rotating shaft 1 between this electromagnet 16 and the valve member 10, a first magnetic ring 18 is arranged. Furthermore, a second magnetic ring 19 is fixed between the electromagnet support 17 and the case 2-1 so as to surround the first magnetic ring 18.

Figure 3A:
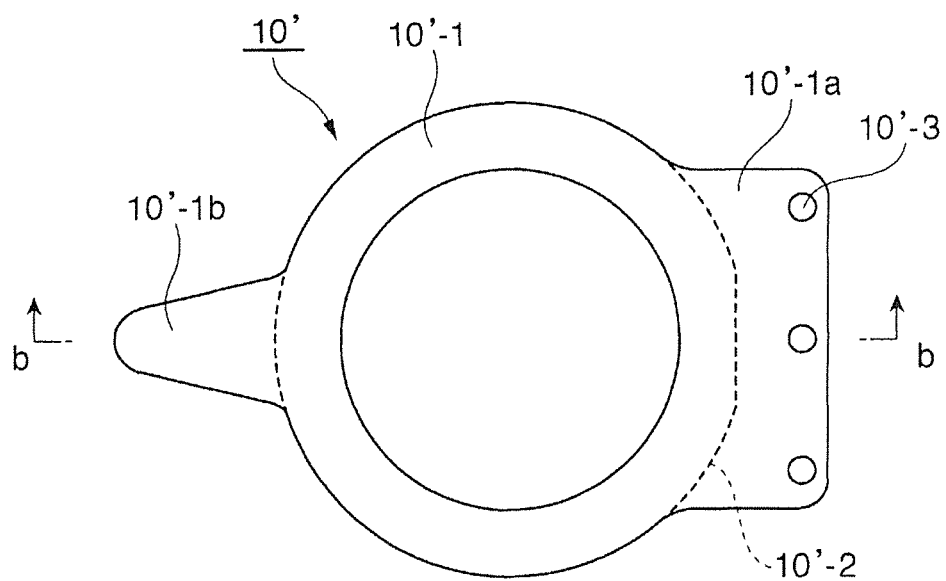
FIG. 3 is a diagram for describing a valve member (armature of single piece type) of a conventional external control type fan clutch device, in which (A) is a schematic plan view and (B) is a schematic longitudinal sectional view on a b-b line in the figure (A).
Figure 3B:
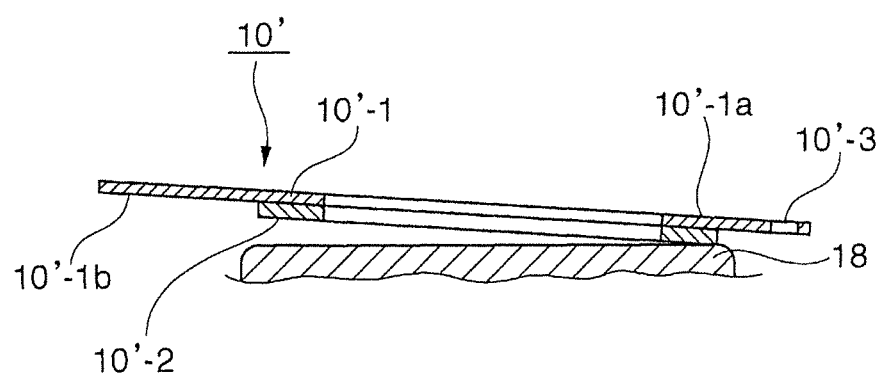

Here, to compare the present invention of the external control type fan clutch device having the above structure and the structure a conventional valve member, the conventional valve member is first described based on FIG. 3. That is, a conventional valve member 10' (armature of single piece type) depicted in (A) and (B) of FIG. 3 is structured to be formed of a plate spring 10'-1 with an annular main body and an armature 10'-2, the plate spring 10'-1 having a base end 10'-1a and a triangular protrusion 10'-1b formed at an end opposite to the base end 10'-1a, with a single-piece annular armature 10'-2 being attached to a back surface of the annular part of this plate spring 10'-1. And, in this conventional valve member 10', the base end 10'-1a of the plate spring is externally inserted in the rotating shaft 1 so that the armature 10'-2 of the valve member is positioned near the rotating shaft 1, and is fixed by a screw or the like to the fastened portion 11 provided on a back surface side of the case. In the drawing, 10'-3 denotes a mount hole. However, in the case of the valve member 10' with the single-piece annular armature 10'-2 laminated on the plate spring 10'-1, in a non-excited state of the electromagnet 16, the plate spring 10'-1 of the valve member is in a state of being separated away from the oil circulating flow passage 8, with only a fixed part of the base end 10'-1a of the plate spring being taken as a bend point. Thus, if the stroke of the valve member is increased to increase the opening amount in order to increase the amount of oil supply, the triangular protrusion 10'-1b of the plate spring is separated greatly away from the oil circulating flow passage, thereby causing inconveniences such as a shortage of the attracting force of the armature 10'-2 by the electromagnet 16 and an increase of the stress of the plate spring 10'-1 to make valve open/close operation unstable. That is, the reason for this is that the conventional valve member 10' uses the armature 10'-2 of the single piece type (one sheet) and the valve member thus has one bend point.

Figure 2A:
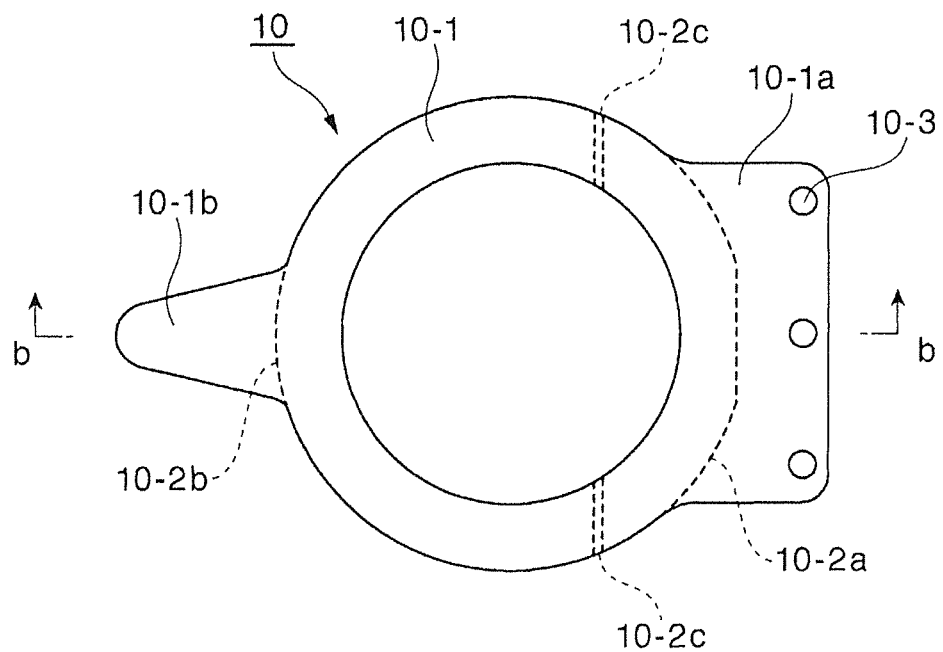
FIG. 2 is a diagram depicting a valve member (armature of division type) of the external control type fan clutch device depicted in FIG. 1, in which (A) is a schematic plan view and (B) is a schematic longitudinal sectional view on a b-b line in the figure (A).
Figure 2B:
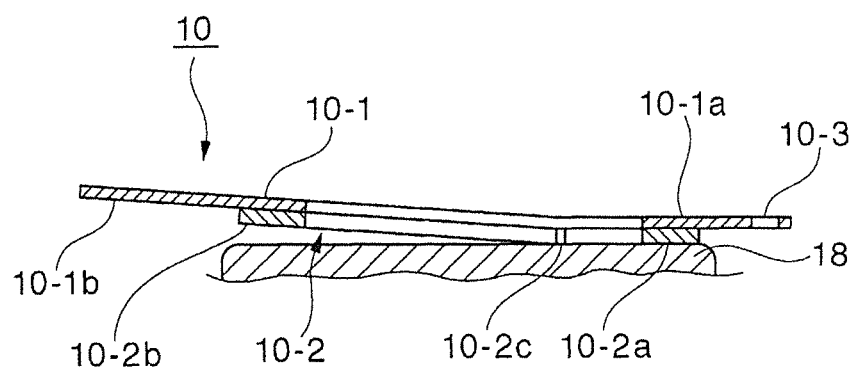

By contrast, the valve member 10 of the present invention is made by changing the conventional single-piece armature to an armature divided into a plurality of pieces to increase the number of bend points of the plate spring so that the stress of the plate spring can be dispersed. The structure of the valve member 10 is similar to that of the conventional valve member 10' depicted in (A) and (B) of FIG. 3 described above except that the divided armature is adopted as depicted in (A) and (B) of FIG. 2. That is, the valve member 10 of the present invention is formed of a plate spring 10-1 with an annular main body and an armature 10-2 of the division type, the plate spring 10-1 having a base end 10-1a and a triangular protrusion 10-1b formed at an end opposite to the base end 10-1a. On a back surface of the annular portion of the plate spring 10-1, the armature 10-2 divided into, for example, two armature pieces 10-2a and 10-2b, is attached on the back surface of the plate spring 10-1 in a direction from the base end 10-1a side to the triangular protrusion 10-1b side of the plate spring. A dividing part 10-2c of these two-divided armature pieces 10-2a and 10-2b is taken as another one bend point of the plate spring 10-1. In the valve member 10 of the present invention adopting this divided armature 10-2, as described above, the armature 10-2 of the valve member is externally inserted in the rotating shaft 1 so as to be positioned near the rotating shaft 1, and the base end of the plate spring 10-1 is fixed by the screw or the like to the fastened portion 11 provided on the back surface side of the case inside the oil flow space 9. In the drawing, 10-3 denotes a mount hole.

In the external control type fan clutch device of the present invention adopting the above-structured valve member 10, when the electromagnet 16 is turned OFF (non-excited), the armature 10-2 is separated away from the oil circulating flow passage 8 by the action of the plate spring 10-1 to open the oil circulating flow passage 8, cause the oil reservoir chamber 5 and the torque transmission chamber 6 to communicate, and cause oil inside the oil reservoir chamber 5 to be supplied to the torque transmission chamber 6. Here, the plate spring 10-1 of the valve member 10 opens with the dividing part 10-2c of the two-divided armature pieces 10-2a and 10-2b taken as a bend point. Thus, of the two-divided armature pieces 10-2a and 10-2b, the divided armature piece 10-2*a* provided on the base end 10-1*a* side of the plate spring is in a state of being nearly in contact with the second magnetic ring 19. On the other hand, when the electromagnet is turned ON (excited), the armature 10-2 is attracted against the plate spring 10-1 to cause the oil circulating flow passage 8 to be closed by the triangular protrusion 10-1*b* of the plate spring 10-1 to interrupt the supply of the oil inside the oil reservoir chamber 5 to the torque transmission chamber 6. Here, the plate spring 10-1 of the valve member 10 is closed with the dividing part 10-2*c* of the two-divided armature pieces 10-2*a* and 10-2*b* taken as the bend point, and thus the attracting force of the armature can be decreased compared with the case in which the base end of the plate spring 10-1 is taken as a bend point. Therefore, for example, even if the stroke of the valve member 10 is set large to increase the amount of oil supply to the torque transmission chamber, the valve member 10 can be activated without increasing the attracting force of the armature 10-2 by the electromagnet 16. Also, by further dividing the armature 10-2 into more pieces to increase the number of bend points of the plate spring 10-1, the stress acting on the plate spring 10-1 can be further dispersed.

In this manner, according to the present invention, even if the plate spring of the valve member is separated greatly away from the oil circulating flow passage, the stress of the plate spring is not increased, and the attracting force of the armature by the electromagnet does not run short. Thus, stable valve open/close operation can be achieved with a normal electromagnet, and an electromagnet with a large magnetic force is not required to enhance the attracting force of the plate spring, thereby allowing a small-sized, lightweight external control type fan clutch device to be achieved.

Note that the embodiment has been described by taking, as an example, an external control type fan clutch device in which a valve member with two bend points of the plate spring and two-divided armature pieces is adopted. However, the number of bend points of the plate spring and the number of divided armature pieces are assumed to be set as appropriate in consideration of the stroke of the plate spring, dispersion of the stress, and so forth. Also, while the case has been described herein that the external control type fan clutch device is applied to one of a type provided with an oil reservoir chamber in a case of a sealed housing, it goes without saying that the embodiment can be applied also to an external control type fan clutch device structured to be provided with an oil reservoir chamber on a drive disk side.

REFERENCE SIGNS LIST

1 . . . rotating shaft (driving shaft)
2 . . . sealed housing
2-1 . . . case
2-2 . . . cover
3 . . . drive disk
5 . . . oil reservoir chamber (oil storage chamber)
6 . . . torque transmission chamber
8 . . . oil circulating flow passage (oil supply port)
9 . . . oil flow passage (oil flow space)
10 . . . valve member
10-1 . . . plate spring
10-1*a* . . . base end of spring
10-1*b* . . . triangular protrusion
10-2 . . . armature
10-2*a*, 10-2*b* . . . divided armature piece
10-2*c* . . . dividing part (bend point)
10-3 . . . mount hole
11 . . . fastened portion of valve member
13, 14 . . . bearing
16 . . . electromagnet
17 . . . electromagnet support
18 . . . first magnetic ring
19 . . . second magnetic ring

The invention claimed is:

1. An external control type fan clutch device comprising:
a sealed housing formed of a non-magnetic case and a cover attached to the case and supported via a bearing on a rotating shaft having a drive disk fixed thereto;
a torque transmission chamber having the drive disk built therein and an oil reservoir chamber provided inside the sealed housing;
at least one oil circulating flow passage communicating with a torque transmission gap and provided on a side wall surface of the oil reservoir chamber;
a magnetic valve member which opens and closes the oil circulating flow passage, the valve member configured to have an armature attached to a plate spring whose one end is attached to the sealed housing;
an electromagnet supporting the rotating shaft via a bearing; and
a ring-shaped magnetic member provided on an outer periphery of the rotating shaft,
wherein the valve member is activated by the electromagnet to control opening and closing of the oil circulating flow passage, and
an effective contact area of oil in the torque transmission gap formed between a drive side and a driven side is increased and decreased to control rotation torque transmission from the drive side to the driven side, wherein:
the valve member has a structure in which the armature attached to the plate spring of the valve member is divided into a plurality of pieces in a direction from a base end side toward an oscillating end side of the plate spring to provide a plurality of bend points of the plate spring.

* * * * *